(12) United States Patent
Ruhl et al.

(10) Patent No.: US 6,489,050 B1
(45) Date of Patent: Dec. 3, 2002

(54) APPARATUS AND METHOD FOR COOLING HIGH-TEMPERATURE FUEL CELL STACKS

(75) Inventors: Robert C. Ruhl, Cleveland Heights, OH (US); Christopher E. Milliken, South Euclid, OH (US); Michael A. Petrik, Highland Heights, OH (US)

(73) Assignee: Technology Management, Inc., Cleveland, OH (US)

( * ) Notice: Subject to any disclaimer, the term of this patent is extended or adjusted under 35 U.S.C. 154(b) by 0 days.

(21) Appl. No.: 09/430,979

(22) Filed: Nov. 1, 1999

(51) Int. Cl.$^7$ ............... H01M 8/04; H01M 10/50
(52) U.S. Cl. ............... 429/26; 429/34; 429/30; 429/120
(58) Field of Search ............... 429/34, 38, 30, 429/26, 120

(56) References Cited

U.S. PATENT DOCUMENTS

| | | | | |
|---|---|---|---|---|
| 4,853,100 A | * | 8/1989 | Hsu ............... | 204/256 |
| 5,116,696 A | | 5/1992 | Barp ............... | 429/26 |
| 5,198,312 A | | 3/1993 | Irino et al. ............... | 429/26 |
| 5,212,023 A | | 5/1993 | Diethelm ............... | 429/20 |
| 5,338,622 A | | 8/1994 | Hsu et al. ............... | 429/26 |
| 5,366,819 A | | 11/1994 | Hartvigsen et al. ............... | 429/17 |
| 5,376,472 A | | 12/1994 | Hartvigsen ............... | 429/20 |
| 5,426,002 A | | 6/1995 | Matsumura et al. ............... | 429/20 |
| 5,480,738 A | | 1/1996 | Elangovan et al. ............... | 429/32 |
| 5,501,781 A | | 3/1996 | Hsu et al. ............... | 204/269 |
| 5,518,827 A | | 5/1996 | Matsumura et al. ............... | 429/19 |
| 5,527,631 A | | 6/1996 | Singh et al. ............... | 429/20 |
| 5,612,149 A | | 3/1997 | Hartvigsen et al. ............... | 426/26 |
| 5,635,039 A | | 6/1997 | Cisar et al. ............... | 204/252 |
| 5,750,278 A | | 5/1998 | Gillett et al. ............... | 429/24 |
| 5,763,114 A | * | 6/1998 | Khandkar et al. ............... | 429/20 |
| 5,770,326 A | * | 6/1998 | Limaye ............... | 429/30 |
| 6,280,866 B1 | * | 8/2001 | Demetri ............... | 429/26 |

FOREIGN PATENT DOCUMENTS

| | | | | |
|---|---|---|---|---|
| EP | 222880 B1 | 8/1991 | ............... | C25D/5/02 |
| EP | 473540 B1 | 4/1992 | ............... | H01M/8/04 |
| EP | 530451 B1 | 3/1993 | ............... | H01M/8/24 |
| EP | 549695 B1 | 7/1993 | ............... | H01M/8/24 |

* cited by examiner

*Primary Examiner*—Patrick Ryan
*Assistant Examiner*—Raymond Alejandro
(74) *Attorney, Agent, or Firm*—Renner, Kenner, Greive, Bobak, Taylor & Weber

(57) ABSTRACT

An electrochemical apparatus and method for cooling the same. The apparatus comprises a stack of at least two compact cells. The cells have a maximum thermal pathway of about 4 centimeters. The cell includes a solid electrode layer disposed between an oxygen electrode layer and a fuel electrode layer. A separator layer contacts the surface of opposing electrodes of adjacent cells. The cell defines internal passages, for providing reactant gases to the electrodes, and a rim portion of the cell is adapted to radiate heat generated within the cell to outside the cell. At least one layer of the cell is adapted to conduct the cell heat to the rim for transfer by radiative cooling. The method of cooling the above apparatus includes feeding oxygen-bearing gas to the oxygen electrode at a low flow rate, conducting the heat produced within the cell to the cell rim, and radiating the heat from the cell rim.

22 Claims, 2 Drawing Sheets

APPARATUS AND METHOD FOR COOLING HIGH-TEMPERATURE FUEL CELL STACKS

TECHNICAL FIELD

The present invention relates to fuel cells. In particular, the present invention relates to solid oxide fuel cells. More particularly, the present invention relates to solid oxide fuel cell stacks cooled substantially by conductive/radiative mechanisms.

BACKGROUND OF THE INVENTION

Fuel cells offer many advantages over conventional power generation systems. It is generally known that such devices are capable of delivering high quality electric power with greater efficiency and lower emissions when compared to comparably sized gas or diesel fed generators. Further, such systems are generally modular and can fulfill a wide range of energy needs including remote site power generation, light utility, and transportation applications as well as commercial cogeneration and residential applications.

Solid oxide fuel cells are well known devices that are capable of producing electric power at higher efficiency, however, there are a number of major hurdles including issues of operation, scale, and cost. These three factors tend to be highly correlated. Answers to materials and operational problems tend to result in difficult issues of scale and cost.

The present invention is directed generally to an electrochemical apparatus for oxidation or consumption of a fuel, and the generation of electricity, such as, a solid electrolyte fuel cell, and more particularly to fuel cells constructed of stacked plate components. Although particular embodiments are applicable to conventional co-fired solid electrolyte fuel cell apparatus, the present invention is particularly useful when utilizing non-co-fired solid oxide electrolyte fuel cells, preferably non-cofired and planar, that contain a stack of multiple assemblies or cells. Each assembly, or cell, comprises a solid electrolyte disposed between a cathode and an anode, being bounded by separators which contact the surface of the electrode opposite the electrolyte. A fuel manifold and generally two air manifolds pass gas through or over assembly elements, with gaskets sealing the anode adjacent to the air manifolds and a gasket sealing the cathode adjacent to the fuel manifold to minimize fuel and air mixing within the cell.

The fuel cell operates by the introduction of air to the cathode and the ionization of oxygen at the cathode/electrolyte surface. The oxygen ions move across the gas non-permeable electrolyte to the anode interface, where they react with the fuel flowing into the anode at the anode/electrolyte interface, releasing heat and supplying their electrons to the anode. The electrons pass through the anode and separator into the next adjacent cathode.

A key requirement in all fuel cell systems is the need for heat removal from the stack or bundle. The heat released by fuel oxidation is always significantly greater than the electric power which may be extracted from the fuel cell stack. Known fuel cell systems prefer to operate at nearly isothermal conditions in order to minimize internal thermal stresses and to achieve a good balance between stack life and performance. The typical operating temperature for a solid oxide fuel cell is about 600° C. to 1,000° C.

In known solid oxide fuel cell devices, the dominant cooling mechanism for heat removal from the fuel cell stack or bundle is convective heat transfer using air as the cooling fluid. In this scheme, cold air is forced through the system using a blower or compressor. The air is partially heated in a heat exchanger by hot air and/or exhaust. The preheated air (at a temperature below stack operating temperature) is then introduced to the fuel cell stack or bundle. The air flows through the stack, interacting chemically to provide oxygen to the electrochemical reaction while adsorbing heat from the internal stack surfaces. The oxygen-depleted hot air is then released from the stack and redirected through the heat exchanger outside of the stack to preheat new incoming air.

There are several issues that must be considered in this scheme. First, to minimize the thermal stress to the stack, the incoming air is preheated to a temperature not too far below the desired operating temperature. However, preheating the air limits its ability to adsorb more heat from the stack (essentially, the heat capacity and change in temperature dictate the amount of heat that can be removed). To compensate, considerably more air must be driven through the stack than is required for satisfactory electrochemical operation.

The amount of air necessary for completing the chemical reaction is called the stoichiometric ratio, or stoic. Typical planar fuel cells require 6–10 stoics of air to maintain thermal control.

The size and weight of the required heat exchanger for air preheating is proportional to this quantity of air, and further depends upon its heat duty, stream flow rates, temperature approach, and allowable pressure drops. Preheating air to the temperatures required for solid oxide fuel cells in particular requires heat exchangers made of expensive high-temperature materials. To accommodate the bulk and cost of the heat exchanger, known solid oxide fuel cell systems are generally limited to producing at least 10 kW of power. These systems are thus impracticable for smaller, lower cost applications. Additionally, these systems, because of their size and cost, are impractical for portable or mobile applications where weight and size are critical issue.

Matsumura U.S. Pat. No. 5,426,002 and Elangovan 5,480,738 describe examples of fuel cells that use conductive cooling to control the temperature in a fuel cell.

Hsu U.S. Pat. No. 5,338,622, also describes a conductive method of controlling fuel cell temperature. Hsu, however, uses a working fluid instead of the oxidant air to conduct heat from the fuel cell. While using the working fluid reduces the amount of air used, the working fluid is disadvantageous because it adds expense and requires additional components for providing it to the heat exchanger.

Thus, it is desirable to utilize a thermal control mechanism that requires less air to control fuel cell temperature. It is further desirable to reduce the size and expense of the heat exchanging equipment and thus reduce the size of the balance of systems to provide for smaller fuel cell systems, such as for residential or portable use.

SUMMARY OF THE INVENTION

We have found that an electrochemical apparatus employing relatively small sized solid oxide fuel cells using conduction and radiation heat rejection as the primary thermal control mode for the stack presents significant improvements over other known methods. These include a significant reduction in the air flow required to cool the stack, leading to more compact stacks and smaller, lighter, and less expensive balance-of-system equipment.

According to the present invention, the major mechanism of heat removal is shifted from on-cell convective cooling to conduction within the stack plus radiation from the outer surface of the stack. The thermal enclosure (surfaces surrounding the stack) is then cooled by conventional methods including heat exchange with incoming air, fuel, or auxiliary air. By shifting the stack cooling mechanism, several benefits can be realized. First, the need for excess air is dramatically reduced. The typical air flow rate is very low, being about 1 to about 3 times stoichiometric (depending on system design parameters). This greatly reduces the size, weight, and complexity of the air heat exchanger. Further, the air is typically preheated close to the stack temperature, which minimizes the thermal stresses and temperature gradients in the stack. The improved cooling method provides a number of characteristics that present unique opportunities for the solid oxide fuel cell industry.

The present invention therefore provides an electrochemical apparatus comprising: a stack of least two compact fuel cells, wherein the cell maximum thermal pathway is up to about four centimeters. The cell has a solid electrolyte layer disposed between an oxygen electrode layer and a fuel electrode layer. A separator layer contacts the surface of opposing electrodes of adjacent cells opposite the electrolyte. The cell defines internal feed passages for providing reacting gases to the electrodes and has a rim portion adapted to radiate cell heat outside the cell. At least one layer of the cell is adapted to conduct cell heat to the cell rim for transfer by radiative cooling. In one embodiment, the separator is adapted for and capable of efficient heat conduction from the interior of the cell to its rim.

The present invention further provides an electrochemical apparatus comprising: a stack of at least two compact cells; wherein the cell maximum thermal pathway is up to about four centimeters; wherein the cell has a solid electrolyte layer disposed between an oxygen electrode layer and a fuel electrode layer, and a separator layer contacting the surface of opposing electrodes of adjacent cells opposite the electrolyte. The cell defines an internal feed passage for providing one reactant gas to one of said electrodes, and the other electrode is adapted to permit a second reactant gas to flow into the other electrode. The cell has a rim portion adapted to radiate cell heat outside the cell, and at least one layer of the cell is adapted to conduct cell heat to the cell rim for transfer by radiative cooling. The cell preferably has a symmetrical planar cross-sectional shape. The second reactant gas may flow into the other electrode by gas diffusion.

The present invention further provides a method for cooling an electrochemical apparatus wherein the apparatus comprises a stack of at least two solid oxide fuel cells, wherein each cell has a solid electrolyte disposed between an oxygen electrode and a fuel electrode, a separator contacting the electrodes of adjacent cells, wherein the cell defines internal feed passages for providing an oxygen-bearing gas and a fuel gas, the method comprising: feeding the oxygen-bearing gas to the oxygen electrode at a low flow rate; reacting the fuel gas at the fuel electrode, conducting the heat produced within the cell to a cell rim, and radiating the heat from the cell rim.

DETAILED DESCRIPTION OF THE INVENTION

Figure 1:
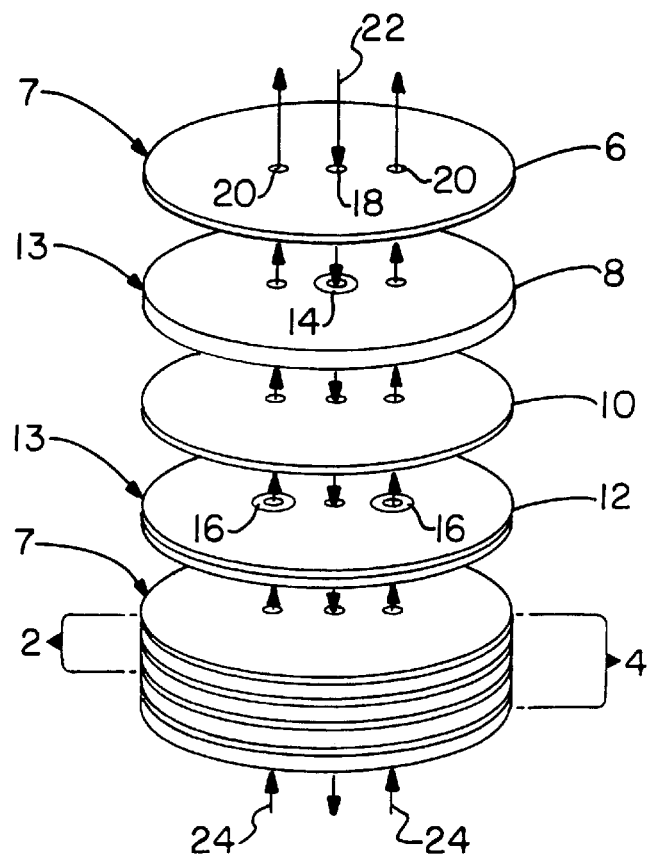
FIG. 1 is a schematic exploded view of a fuel cell and stack according to the present invention.
Figure 3:
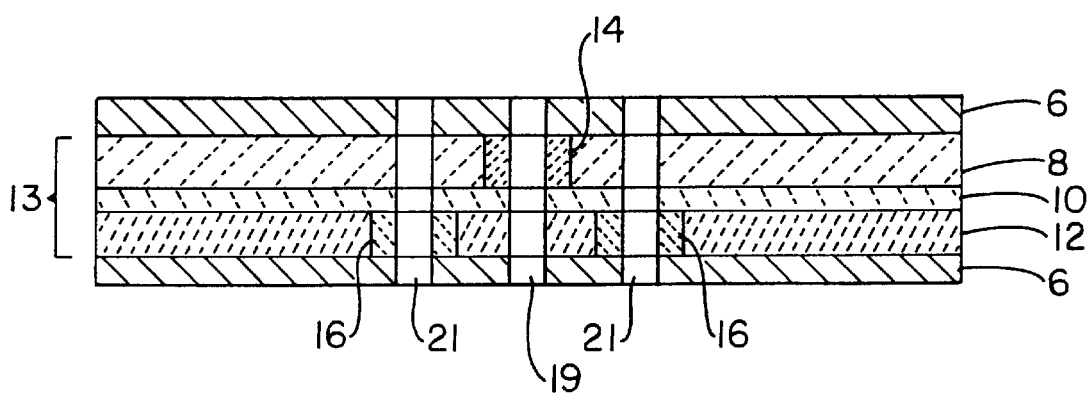
FIG. 3 is a partially schematic sectional side view of a cell as shown in FIG. 1.

Although applicable to other types of electrochemical apparatus, for purposes of this description, the invention will be described in relation to its incorporation into a solid electrolyte (oxide) fuel cell, an example of which is described in U.S. Pat. No. 5,445,903 to Cable et. al., incorporated herein by reference. FIG. 1 shows a schematic exploded view of one preferred embodiment of a solid-oxide fuel cell 2 and a stack of two such cells 4. The cell generally comprises four stacked layers: a separator layer 6, a cathode or oxygen electrode layer 8, an electrolyte 10, and an anode or fuel electrode layer 12. A tubular gasket 14 in the cathode layer forms a seal between the separator and electrolyte. A pair of tubular gaskets 16 in the anode layer form seals between the electrolyte and separator. FIG. 3 shows a schematic cross-section of one cell with a separator at each end.

The separator contains an internal hole 18 which is aligned with corresponding holes in the other cell layers to form an internal fuel manifold 19. It also contains a pair of internal holes 20 which are aligned with corresponding holes in the other cell layers to form a pair of internal air manifolds 21. It is within the scope of the invention to include multiple fuel passages and/or oxygen passages in various locations within the cell, preferably close to the centerline of the cell. A suitable hot fuel gas mixture 22 represented by an arrow, is fed to the internal fuel manifold 19 and hot air 24, represented by arrows, is fed to both internal air manifolds 21.

The stack of fuel cells will typically operate at about 850 to 1000° C., but may operate as low as 600° C. with suitable low-temperature solid electrolytes.

The separators 6 must be impervious to gases, be good conductors of electrons, and have good long-term compatibility with both the adjacent material and with the air and fuel mixtures. They should also be fairly good conductors of heat. Suitable materials include doped lanthanum chromite or high-temperature metallic alloys, such as RA330, Ducralloy, Inconel 601, or Haynes 230 available from Rolled Alloys, Plansee, Inco Alloys International, and Haynes respectively.

The porous cathode layer or oxygen electrode 8 is generally made of a mixed oxide preferably strontium-doped lanthanum manganite (LSM). It should have an air-flow geometry which produces uniform air distribution with moderate pressure drop at the required flow rate. It may be prepared by conventional ceramic processing procedures, including power pressing, tape casting, or extrusion.

The electrolyte is impervious to gases and is a good oxygen ion conductor while having little or no electronic conductivity. Yttria-doped zirconia having about 3 to 10 mole percent $Y_2O_3$ is preferred. The electrolyte is preferably coated with a thin fired layer of LSM on the cathode side and nickel oxide/doped ceria on the anode side.

The porous anode layer is preferably made of nickel felt, nickel-zirconia cermet, or other nickel-containing cermet or alloy.

The gaskets 14 and 16, are made of either glass-ceramics or from high-temperature metallic alloys.

Cell and stack diameters are typically 50–60 mm and total cell thickness (in use) is typically 1.0–1.5 mm.

When the cells 2 are stacked, a series electrical connection is established among all the cells in the stack, such that the stack voltage is the sum of all the cell voltages. In use, a stack is clamped between a pair of high-temperature electrical contact blocks equipped with mating holes for feeding gaseous fuel and air. At one end of the stack 4, the separator 6 is omitted and thus the stack 4 is bounded by a cathode layer 8 at one end and an anode layer 12 at the other end. The fuel gas and air may be fed into opposite ends or the same ends of the stack.

The stack is operated by preheating close to operating temperature, supplying air and fuel gas, and connecting an external electric load. Oxygen from the air is ionized at or near the cathode-electrolyte interface. The oxygen ions flow through the electrolyte 10 under the influence of the chemical potential difference. At or near the electrolyte-anode interface the oxygen ions combine with fuel molecules (chiefly hydrogen and carbon monoxide), releasing electrons which flow into the next cell. Typical power densities are on the order of 150 mW/cm$^2$ of electrode area at typical cell operating voltages near 0.6 volts. Typical stack volumetric power densities are close to 1.0 kilowatt/liter.

In a preferred embodiment of the invention, the anode may comprise the sulfur tolerant anode material of U.S. Pat. No. 5,589,285, incorporated herein by reference. Although the invention is described herein in connection with a planar, non-cofired fuel cell embodiment, it is fully applicable to other types of solid oxide fuel cells, including cofired solid oxide fuel cells.

In one embodiment, the electrochemical apparatus comprises a cell having a symmetrical shape; the cell has a solid electrolyte disposed between an oxygen electrode and a fuel electrode; a separator capable of efficient heat conduction from the interior of the cell to its rim and contacting the surface of opposing electrodes of adjacent cells opposite the electrolyte; and the cell defines interior feed holes for providing reactant gases. The reactant gases are fed at low flow rates and with high preheat temperatures, such that, cell heat is conducted to the cell rim where the cell heat is expelled by radiative cooling.

In another embodiment the electrochemical apparatus comprises a circular cell, the cell having a diameter of up to about 8 cm; the cell has a solid electrolyte 10 disposed between an oxygen electrode 8 and a fuel electrode 12, a separator 6 capable of efficient heat conduction from the interior of the cell 2 to its rim 7 and contacting the surfaces of opposing electrodes 13 of adjacent cells opposite the electrolyte; and the circular cell defines interior feed holes for providing reactant gases. The reactant gases are fed at low flow rates and with high preheat temperatures, such that, cell heat is conducted to the cell rim where the cell heat is expelled by radiative cooling. Exhaust gases and excess air are generally expelled at the cell rim.

Figure 2:
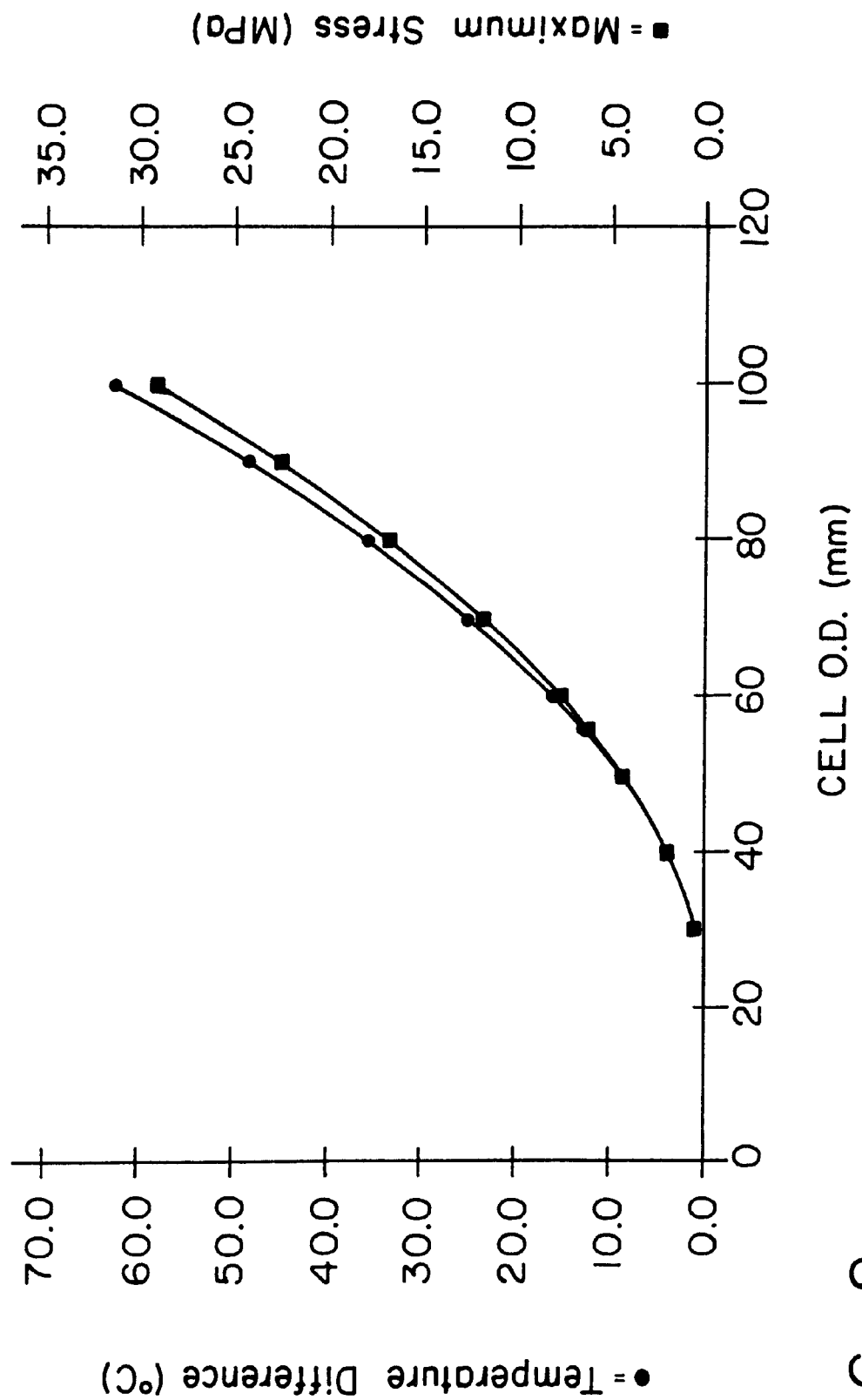
FIG. 2 is a graphical representation of the relationship between fuel cell size and the temperature differential and maximum thermal stress within the cell.

The size of the individual cells is made small in order to: (1) limit the thermal stresses and temperature differences within the cell, (2) limit the total cell thickness required, and (3) to limit the required temperature difference between the stack and its surroundings. FIG. 2 illustrates how, for a typical example circular cell operated at its design conditions, cell size strongly influences both maximum thermal stress in the ceramic electrolyte and the maximum temperature difference within the cell under constant average current density, voltage, reactant utilizations, and cell center temperature.

Larger cell diameters, in addition to the large stresses and temperature differentials noted above, also require thicker cells in order to achieve the desired air pressure drops with the larger air flows per cell which are required. In addition, the radiation cooling of the surface of larger cells requires larger temperature differentials between stack surface and surroundings due to the lower surface/heat release ratio of larger stacks. Since the surroundings are used to preheat stack reactants (air and/or fuel), their preheat temperatures are lower, which leads to undesirable additional temperature differences along the length of a stack. A preferred diameter for a circular design is usually about 5–6 cm, depending on the cell separator thermal conductivity, cell heat release, separator thickness, and other factors.

The cell cross section may be of any shape, although radial is preferred. Symmetrical cell designs are preferred including circular (most preferred), oval, or any regular polygon shape. Non-symmetrical geometric shapes, however, can be used as well, within the thermal pathway length criteria. In the preferred embodiment, shown in FIG. 1, the cell is a circular flat plate design with central feed holes and a maximum diameter of about 8 centimeters. These cells will have approximately radial heat flow, with a maximum heat flow path length of under about 4 cm (the feed holes at the center of the cell do not generate heat).

As a further advantage, smaller components are easier to fabricate with fewer critical flaws and higher yields. An internal fuel gas and air feed flow geometry also minimizes the opportunity for seal leakage by the minimizing the seal perimeter.

For cells having other than a circular shape, a preferred maximum heat-conduction-path length should also be under about 4 cm. Or preferably, a maximum heat-conduction-path length should be from about 2.5 cm to about 3 cm for cells having a diameter of 5 to 6 centimeters.

The stack is operated by preheating the apparatus close to operating temperature, supplying air and fuel gas, and connecting an external electric load. Oxygen from the air is ionized at, or near, the cathode-electrolyte interface. The oxygen ions flow through the electrolyte under the influence of the chemical potential difference. At, or near, the electrolyte-anode interface the oxygen ions combine with fuel molecules (chiefly hydrogen and carbon monoxide), releasing electrons which flow into the next cell. Typical power densities are on the order of 150 mW/cm$^2$ of electrode area at typical cell operating voltages near 0.6 volts. Typical stack volumetric power densities are close to 1.0 kilowatt/liter.

The cathode layer 8 is preferably a porous body having a thickness in the range of about 0.2–0.6 mm, and composed of conventional cathode material, most preferably an oxide having the perovskite crystalline form such as strontium doped lanthanum manganite ($LaMnO_3$), and doped calcium manganite ($CaMnO_3$), lanthanum chromite ($LaCrO_3$), lanthanum cobaltite, ($LaCoO_3$), lanthanum nickelite ($LaNiO_3$), lanthanum ferrite ($LaFeO_3$), or mixtures thereof. The cathode 8 may comprise mixed ionic/electronic conductors such as an appropriately doped perovskite oxide. The cathode 8 can be prepared by conventional ceramic processing procedures, for making a flat, planar structure, including pressing a powder, or extruding or tape casting a green body, and sintering either prior to or during the initial operation of the apparatus.

Electrolyte 10 is a thin wafer, less than about 0.4 mm thick, preferably about 0.2 mm or less of conventional solid oxide fuel cell electrolyte material. Representative electrolytes include zirconia ($ZrO_2$) stabilized with 3 to 10 mole percent of yttria ($Y_2O_3$), doped cerium oxide, doped bismuth oxide, and oxide ion conducting perovskites. Electrolyte 10 is substantially impervious to gases, however, ionized oxygen can migrate through the electrolyte under the influence of an applied oxygen potential.

The quality of the electrical contact between the cathode 8 and the electrolyte 10 may be improved by initially applying a thin layer of substantially the material that comprises the cathode 8 (or is at least electrochemically compatible with the cathode) to the surface of the electrolyte 10 adjacent the cathode 8 in the form of a paint or ink including a volatile vehicle to form an electrical contact zone. Likewise, a paint or ink containing substantially anode material such as nickel or nickel oxide may be applied to the surface of the electrolyte adjacent the anode to form such an electrical contact zone. This electrolyte surface coating may be applied by other conventional techniques also, such as plasma deposition, spin casting, spraying or screen printing.

The thickness of the electrolyte surface coatings is generally on the order of about 1 to less than about 100 microns, and preferably less than 50 microns. It has been found that the thicker this surface coating is applied, the less gas is able to contact the electrolyte 10, and the more tendency there is for the coating to peel off. Unless specifically stated to the contrary, the electrolyte 10 as mentioned in this Specification shall mean the electrolyte 10 with or without either or both cathode and anode material surface coatings.

Anode 12 is a porous body, and may comprise conventional solid oxide fuel cell anode material. Preferably, the anode comprises either nickel felt or else a finely divided, compressed metallic powder such as nickel blended with a stable oxide powder such as zirconia, ceria, yttria or doped ceria. As described above regarding the cathode 8, the anode 12 may comprise a mixed conductor, optionally combined with an electronically conducting material. Other examples include ceria which can be doped with an oxide of lanthanum, zirconium or thorium, optionally containing an electronically conducting phase such as Co, Ru, or Pt. The thickness of the anode is preferably about 0.1 mm to about 0.5 mm in thickness. Like cathode 8, anode 12 may be sintered during cell operation or before initial operation in an overheating sintering step.

The thickness of the entire invention cell repeat unit (separator, electrodes, and electrolyte) is less than the air groove depth alone of most known flat plate systems, yet the cell has sufficient thermal conduction to reject the heat from the center of the cell to the perimeter. The volumetric power density of the cells used in the invention is relatively high due to their small thickness and their good cooling, enabling them to be operated at relatively high power densities per unit area. Stacks of these cells make it possible to design a thermally self sustaining yet high-temperature subassembly based upon very small stack sizes. A complete system has been made based upon stack sizes as small as 250 W which include the fuel reformer and all thermal management systems. Integration at this size is extremely challenging in larger-area cells due to the competing concerns of uniform temperature distribution within the stack and heat loss from the system to the environment.

A plurality of stacks may be assembled into a two-dimensional array with interspersed surfaces of various shapes which are cooled by incoming air and/or fuel.

In another embodiment of the invention, the fuel cell stack contains a single internal hole at its center, which is used to feed fuel gas to the anodes and is sealed from the cathodes. The cathodes receive oxygen via natural diffusion through their internal porosity from the chamber surrounding the stack, which is continually supplied with new oxygen-bearing gas, commonly air.

Other embodiments of the solid oxide fuel cell and its components are disclosed in U.S. Pat. Nos. 5,445,903 and 5,589,285, assigned to the common assignee of the present invention, which patents are hereby incorporated by reference as if fully written out below.

It should now be apparent that various embodiments of the present invention accomplish the objects of this invention. It should be appreciated that the present invention is not limited to the specific embodiments described above, but includes variations, modifications, and equivalent embodiments defined by the following claims.

We claim:

1. An electrochemical apparatus comprising:
   a stack of at least two compact cells;
      wherein the cell maximum thermal pathway length is up to about 4 centimeters;
      wherein the cell has a solid electrolyte layer disposed between an oxygen electrode layer and a fuel electrode layer, and a separator layer contacting the surface of opposing electrodes of adjacent cells opposite the electrolyte;
      wherein the cell defines internal feed passages for providing reactant gases to said electrodes including airflow of about 1 to about 3 times stoichiometric which has been preheated close to stack temperature, and a stack outer surface for radiating cell heat outside the cell;
      wherein at least one layer of the cell, selected from the group consisting of a solid electrolyte layer, an oxygen electrode layer, a fuel electrode layer and a separator layer, removes cell heat by conduction within the stack to the stack outer surface for transfer by radiative cooling from the stack outer surface.

2. An electrochemical apparatus of claim 1 wherein the cell has a symmetrical planar cross-sectional shape.

3. The electrochemical apparatus of claim 2 wherein the symmetrical shape is radial.

4. The electrochemical apparatus of claim 2 wherein the symmetrical shape is an oval and the maximum thermal pathway length is one half of the oval's long axis.

5. The electrochemical apparatus of claim 2 wherein the symmetrical shape is a circle and the maximum thermal pathway length is the circle radius.

6. The electrochemical apparatus of claim 5 wherein said cell has a diameter in the range of about 50 millimeters to about 60 millimeters.

7. The electrochemical apparatus of claim 2 wherein the symmetrical shape is a regular polygon and the maximum thermal pathway length is one half of a diagonal of said polygon.

8. The electrochemical apparatus of claim 1, wherein said cell has a total cell thickness in the range of about 1 millimeter to about 1.5 millimeters.

9. The electrochemical apparatus of claim 1 wherein the reactant gases are a fuel and an oxygen-bearing gas.

10. The electrochemical apparatus of claim 1 wherein the cell defines substantially centrally positioned feed holes for providing reacting gases to the electrodes.

11. The electrochemical apparatus of claim 1 wherein the separator layer conducts cell heat from the interior of the cell to said stack outer surface.

12. An electrochemical apparatus comprising:
   a stack of at least two compact cells;
      wherein the cell maximum thermal pathway length is up to about 4 centimeters;
      wherein the cell has a solid electrolyte layer disposed between an oxygen electrode layer and a fuel electrode layer, and a separator layer contacting the surface of opposing electrodes of adjacent cells opposite the electrolyte;
      wherein the cell defines an internal feed passage for providing one reactant gas to one of said electrodes;
      wherein the other electrode is adapted to permit a second reactant gas to flow into the other electrode;

wherein the flow of one of the first reactant gas and second reactant gas includes airflow of about 1 to about 3 times stoichiometric which has been preheated close to stack temperature;

wherein the cell has a stack outer surface for radiating cell heat outside the cell;

wherein at least one layer of the cell selected from the group consisting of a solid electrolyte layer, an oxygen electrode layer, a fuel electrode layer and a separator layer removes cell heat by conduction within the stack to the stack outer surface for transfer by radiative cooling from the stack outer surface.

13. The electrochemical apparatus of claim 12 wherein the cell has a symmetrical planar cross-sectional shape.

14. The electrochemical apparatus of claim 13 wherein the symmetrical shape is an oval and the maximum thermal pathway length is one half of the oval's long axis.

15. The electrochemical apparatus of claim 12 wherein the symmetrical shape is a circle and the maximum thermal pathway length is the circle radius.

16. The electrochemical apparatus of claim 12 wherein the symmetrical shape is a regular polygon and the maximum thermal pathway length is one half of a diagonal of said polygon.

17. The electrochemical apparatus of claim 12 wherein said separator layer conducts heat from the interior of said cell to said stack outer surface.

18. The electrochemical apparatus of claim 12 wherein said internal feed passage is located substantially centrally within the cell.

19. A method for cooling an electrochemical apparatus wherein the apparatus comprises a stack of a least two solid oxide fuel cells, wherein each cell has a solid electrolyte disposed between an oxygen electrode and a fuel electrode, a separator contacting the electrodes of adjacent cells, wherein the cell defines internal feed passages for providing an oxygen-bearing gas preheated close to stack temperature to the oxygen electrode and a fuel gas to the electrode, the method comprising: feeding the preheated oxygen-bearing gas including airflow of about 1 to about 3 times stoichiometric to the oxygen electrode; reacting the fuel gas at the fuel electrode; removing the heat produced within the cell by conduction within the stack to at least one surrounding stack outer surface; and radiating the heat from the at least one surrounding stack outer surface, by transferring the heat radiated from the at least one surrounding stack outer surface via the at least one surrounding stack surface cooled by an external coolant.

20. The method of claim 19 wherein the external coolant is air.

21. The method of claim 19 wherein the step of conducting the heat produced within the cell to the at least one surrounding stack outer surface is performed substantially via the separator.

22. The method of claim 19 wherein the cell has a maximum thermal pathway length of about 4 cm.

* * * * *